Dec. 20, 1960 M. KOENIGSBERG Re. 24,914

INNERSPRING FOAM MATTRESS

Original Filed April 10, 1956

INVENTOR

Max Koenigsberg

BY

Diggins & LeBlanc

ATTORNEYS

United States Patent Office

Re. 24,914
Reissued Dec. 20, 1960

24,914

INNERSPRING FOAM MATTRESS

Max Koenigsberg, Highland Park, Ill., assignor to The Englander Company, Inc., Chicago, Ill., a corporation of Illinois Original No. 2,874,389, dated Feb. 24, 1959, Ser. No. 577,336, Apr. 10, 1956. Application for reissue Oct. 19, 1959, Ser. No. 847,441

17 Claims. (Cl. 155—179)

Matter enclosed in heavy brackets [ ] appears in the original patent but forms no part of this reissue specification; matter printed in italics indicates the additions made by reissue.

This invention relates to a mattress and more particularly to a novel innerspring and flexible foam mattress construction and to a method of manufacturing the same.

Innerspring mattresses and mattresses of flexible foam are well known and each possesses very desirable features. While various attempts have been made to secure the benefits of both forms of mattress by combining the innerspring construction with the flexible foam surface, no such mattress has heretofore been successfully produced at least on any commercial scale.

Generally in innerspring mattresses with a resilient flexible foam surface it has been necessary to provide a layer of fibrous or other backing material between the springs and the foam in order to prevent the springs from forming lumps or from working into and through the foam layer. This layer of fibers or other backing material increased both the cost and difficulty of manufacture.

Heretofore it has also been necessary to employ various mechanical expedients to secure the inner spring structure and foam surfaces permanently together. In some instances shells of foam material have been preformed to enclose the spring assembly and in other instances the springs have been completely embedded and enclosed in the foam. These mechanical expedients have not been commercially successful and have greatly increased the cost and difficulty involved in the manufacture of such mattresses.

We have found that an innerspring mattress with foam surface can be simply and quickly manufactured with the spring structure permanently secured to the foam in a single operation. The foam adheres strongly to the spring construction and the fibrous or other inserts between the spring structure and the foam surface are unnecessary. We have found that relatively inexpensive innerspring flexible foam mattresses may be manufactured by means of a simple and rapid process wherein a spring assembly is integrally attached to a suitable flexible foam surface layer by foaming the surface layer in place about the springs or by pressing a heated spring assembly into a foam layer to cause the foam to soften or melt locally and reharden adhering to the springs.

It is accordingly a primary object of the present invention to provide an improved method of manufacturing a combination innerspring and flexible foam mattress.

It is another object of the invention to provide an improved combination innerspring and flexible foam mattress.

It is a further object of the invention to provide an improved process for manufacturing a combined innerspring and flexible foam mattress by foaming the covering material in place about the springs.

It is a further object to provide an improved process for securing a foam surface to an innerspring construction.

These and further objects and advantages of the invention will become apparent upon reference to the following specification and claims and appended drawings wherein:

Figure 1:
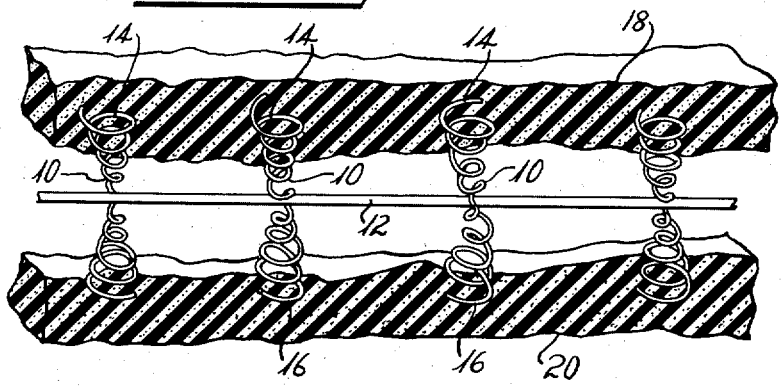
Figure 1 is a perspective view, partly in section, showing an innerspring and flexible foam mattress produced according to the invention; [and]

The spring assembly may be of any suitable form and numerous suitable spring assemblies are known. One preferred form of spring assembly is shown in Figure 1 and comprises a plurality of coil springs 10 mounted upon and secured to a flexible strip 12 by any suitable method such as, for example, the method shown in Patent No. 2,698,444. The convolutions of the springs 10 extend away from the flexible spring strip 12 and have their ends 14 and 16 integrally embedded in slabs of flexible foam material 18 and 20. The edges of the slabs 18 and 20 may be sealed in any suitable manner which forms no part of the present invention.

It is to be understood that substantially any type of spring or spring assembly may be used in the present invention and the foam layer may be of any desired thickness and shape and may be cored or uncored. It is not essential that the foam adhere to all of the spring ends and satisfactory mattresses can be made with the foam adhering to only a portion of the springs or to the border wire or other part of the spring assembly.

If desired some or all of the springs, border wire or the like may be coated with an uncured epoxy resin and catalyst or an isocyanate prepolymer and catalyst. The resin or prepolymer cures with the foam and causes the foam to have a higher density adjacent the interface. This results in a stronger bond between the springs and the foam.

If desired, the foam may be made thicker or an additional sheet or slab of foam may be used in areas which take the greatest body weight.

Foam rubber is generally an unsatisfactory surface for an innerspring mattress and according to the present invention polyurethane foams are preferred. These polyurethane foams are prepared by the reaction of isocyanates with various resins, such as:

EXAMPLE I

A polyalkylether prepolymer is made by reacting 800 parts of polyalkylether with an excess of 2,4 toluene diisocyanate, 235 parts. This solution is reacted first at room temperature for 20 hours and then heated at 140° C. for 2 hours. The prepolymer is cooled to 50–60° C. and additional 2,4 toluene diisocyanate, 35 parts, is added to raise the isocyanate content to 9.5%.

A foam is prepared from this prepolymer according to the following formula:

| | Parts by weight |
|---|---|
| Polyalkylether prepolymer | 100 |
| DC–200 (50 centistokes) | 1 |
| Water | 2.4 |
| N-methyl morpholine | 1.0 |

The DC–200 is a silicone wetting agent produced by Dow Corning. This surface active agent is thoroughly mixed into the prepolymer followed by the addition of the water and N-methyl morpholine catalyst, and mixed well for about 30 seconds, poured into a mold and allowed to foam. The foam will set sufficiently in about 20 minutes to allow the product to be removed.

EXAMPLE II

A polyalkylether prepolymer containing a diisocyanate and a triisocyanate is prepared by reacting 377 parts of polyalkylether with its stoichiometric equivalent of isocyanate, which is made up of 20 parts of a mixed isocyanate containing 80% 2,4 and 20% 2,6 toluene diisocyanate and 40 parts of a solution containing 50% triisocyanatodiphenyl ether and 45–50% 2,4 toluene diisocyanate. This solution is reacted at 35° C. for 20 hours. The prepolymer is then standardized at 10.5% isocyanate content by the addition of approximately 78 parts of 2,4 toluene diisocyanate.

A foam is prepared according to the following formula:

| | Parts by weight |
|---|---|
| Polyalkylether prepolymer | 100 |
| DC–200 (50 centistokes) | 1 |
| Water | 2.65 |
| N-methyl morpholine | 1.5 |

The DC–200 surface active agent is thoroughly mixed into the prepolymer first followed by the addition of the water and N-methyl morpholine catalyst. After mixing well for about 30 seconds, the mass is poured into a mold and allowed to foam. The foam will set sufficiently in about 20 minutes to allow stripping from the mold.

EXAMPLE III

A polyester "one-shot" foam is prepared as follows:

Seventy parts of polyester resin (Selectrofoam 6201) are mixed with two parts of dispersing or wetting agent. Substantially any wetting agent may be used so long as it does not have an inhibiting effect on the reaction and a particularly satisfactory agent is Emcol H–77 produced by Witco Chemical Company. One part of amine catalyst (N-methyl morpholine) and 90% of the theoretical amount of water required to react with all the isocyanate groups in the formulation (2.2 grams) are mixed into the resin. After the above is thoroughly mixed, 30 parts of a mixture of 80% 2,4+20% 2,6 toluene diisocyanate (Hylene TM) are mixed into the above masterbatch using a mixing time of from 8 to 10 seconds, poured into a mold, and allowed to foam. A typical formula is:

| | Parts by weight |
|---|---|
| Selectrofoam 6201 | 70 |
| Emcol H–77 | 2 |
| Water | 2.2 |
| N-methyl morpholine | 1 |
| (Hylene TM organic isocyanate) a mixture of 80% 2,4–20% 2,6 toluene diisocyanate | 30 |

EXAMPLE IV

A polyester prepolymer is prepared by reacting 70 parts of polyester resin (Selectrofoam 6201) with 30 parts of Hylene TM.

This reaction is carried out either with or without agitation (preferably with agitation) under a blanket of nitrogen or dry air to exclude moisture. No heating is necessary if large batches (over 5 gallons) are made. Small batches in the order of 1 gallon or less should be heated for one hour at 100° C. to help complete the reaction. After this prepolymer is cooled, foams can be prepared from this prepolymer according to the following procedure.

A surface active agent such as used in the preparation of "one-shot" foams is mixed in thoroughly. An amine catalyst and water (120% to 140% of the theoretical required to react with all the isocyanate groups is preferred) are mixed in over a period of about 25 to 30 seconds. The mixture is then poured into a mold, and allowed to foam. A typical formula is:

| | Parts by weight |
|---|---|
| Prepolymer | 100 |
| Emcol H–77 | 2 |
| Water | 2.6 |
| N-methyl morpholine | 1 |

Only one typical polyester has been used in this series of examples. However, slight modifications of any of the existing commercial polyesters could be made to work in these formulae.

Ordinarily the foam formed by reacting either a polyester resin or a polyether resin with the isocyanate is preferable as to texture and resilience but other polyurethane foams may be used. The foaming starts shortly after mixing the reaction products and continues for a short while up to about 10 or 15 minutes.

Figure 2:
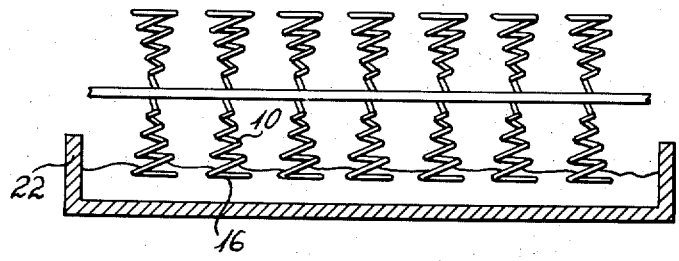
Figure 2 is a cross section of a spring assembly in position prior to the foaming step[.]; *and*

According to one embodiment of the present invention as illustrated in Figure 2, the reaction products are poured into a trough 22 before foaming is complete. The inner surface of the trough 22 is preferably coated with a suitable mold release material such as wax as is known in the art before the foaming material is poured into the trough.

Before the foaming ceases, the springs are positioned within the trough as shown in Figure 2 and the polyurethane foams up around the springs, sealing the springs in place and forming a foam layer of predetermined thickness. This foam layer adheres strongly to the spring and the air contacting surface of the foam forms as a hard tough skin which further serves to lock the springs into place in the foam layer.

After foaming ceases, the polyurethane resin is cured before removal from the trough. At room temperatures, this curing requires about one half hour and curing time may be reduced to about 5 to 10 minutes by the application of heat of about 150 to 180° F. After a resin is cured the spring assembly is inverted and a foam blanket applied to the opposite surface in the same manner.

A satisfactory innerspring mattress with polyurethane foam surfaces may also be prepared by a modified process.

A layer or blanket of polyurethane foam may be first prepared and cured in any suitable manner as for example, in a trough such as trough 22 or by a continuous process. If prepared in a trough such as trough 22, the polyurethane blanket is formed to its finished dimension while if the blanket is formed continuously it is cut to dimension.

After foaming is complete and the polyurethane blanket is cured, a suitable spring assembly is heated to about 400° F. and pressed into the foam. The heated spring softens and melts the foam locally and the melted foam adheres strongly to the spring to form an assembly similar to the assembly shown in Figure 1.

In another preferred form of the invention a polyurethane blanket twice the thickness of the desired finished surface layer is made by a continuous process. The blanket is slit transversely as it is formed and after foaming and curing are complete, a spring assembly heated to the proper temperature of about 400° F., is inserted between the split layers and both foam surfaces are secured simultaneously to the spring assembly. The foam layers may be trimmed to size before or after they are secured to the spring assembly.

The polyurethane foam is sufficiently strong and tough that the springs will not work their way into and through the foam layer in use and the adhesion between the foam layer and the spring assembly is sufficiently strong to maintain a permanent assembly. By controlling the foaming of the polyurethane in a manner known in the art the hardness or softness of the foam layer may be regulated.

Figure 3:
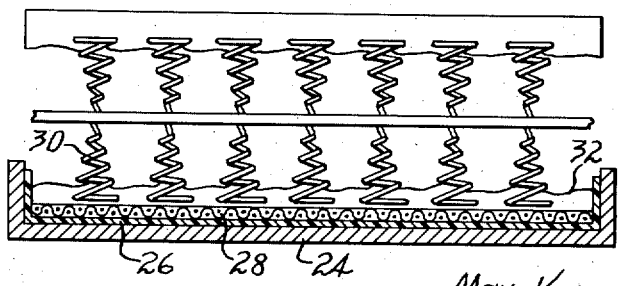
*Figure 3 is a mold and spring assembly for a modified embodiment of the present invention.*

It is also possible to have a cover of fabric or the like secured to the outer foam surface. In one form of the invention *shown in Figure 3*, a trough *24* may be treated with a suitable release agent *26* and the covering fabric *28* placed on the bottom of the trough. The polyurethane is then introduced and foamed up around the spring assembly *30 as indicated at 32*. The resulting foam adheres strongly to both the fabric and the spring assembly. When the foam is formed as a slab or continuously as a blanket, the covering fabric or like material may be placed on one or both sides of the slab or blanket either during formation of the foam or before the foam has entirely cured and a strong permanent bond results.

While the present invention has been described as embodied in a mattress, it is apparent that it is equally applicable to cushions such as vehicle seat cushions and upholstered furniture. The spring and foam assemblies are permanently bonded so that noise or squeaking is eliminated.

From the foregoing it will be apparent that it has been possible to obtain the objects of the invention and provide a new and improved innerspring and foam mattress or cushion construction which may be simply, rapidly and efficiently produced and which forms a strong and durable assembly. After the springs and foam surface layers have been assembled, the mattress or cushion is completed in the usual fashion.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

[1. A method of manufacturing innerspring foam mattresses comprising forming an innerspring assembly, and foaming slabs of flexible polyurethane foam material about terminal portions of the springs in said assembly.]

2. A method of manufacturing innerspring foam mattresses comprising forming an innerspring assembly, immersing one end of the springs of said assembly in a foaming flexible polyurethane resin as foaming occurs, and immersing the other end of said springs in a foaming flexible polyurethane resin as foaming occurs.

[3. A method of manufacturing innerspring foam mattresses comprising forming an innerspring assembly, immersing one surface of the spring assembly in a foaming flexible polyurethane resin as foaming occurs, and immersing the other surface of said spring assembly in a foaming flexible polyurethane resin as foaming occurs.]

4. In a method of forming an innerspring foam mattress, placing a sheet of cover material in the bottom of a trough, positioning an innerspring assembly in said trough in spaced relation to the cover material, and foaming a polyurethane resin in place between said cover material and said innerspring assembly.

[5. A method of manufacturing innerspring foam mattresses combining the steps of forming a slab of flexible polyurethane foam material, forming an innerspring assembly, heating the ends of said springs, and applying said heated spring ends to said slab to cause said heated spring ends to sink into said slab and adhere thereto.]

6. A method of manufacturing innerspring foam mattresses comprising the steps of forming a slab of flexible polyurethane foam material, cutting said slab in half longitudinally to form two slabs, heating the ends of said springs, and applying opposite heated spring ends to said slabs to cause said heated spring ends to sink into aid slabs and adhere thereto.

[7. A method of manufacturing innerpring foam mattresses comprising the steps of forming a slab of flexible polyurethane foam material, forming an innerspring assembly, heating a portion of said spring assembly, and applying said heated portion to said slab to cause said heated portion to sink into said slab and adhere thereto.]

8. A method of manufacturing innerspring foam mattresses comprising the steps of forming an innerspring assembly, forming a flexible polyurethane foam having a surface, and moving said innerspring assembly and foam surface relative to one another so as to cause portions of the innerspring assembly to pass through said surface as said portions of said innerspring assembly are enveloped by aid foam.

[9. An innerspring foam mattress comprising an innerspring assembly having opposed terminal portions thereof embedded in a pair of spaced slabs of flexible polyurethane foam.]

[10. An innerspring foam mattress comprising an innerspring assembly including a plurality of coil springs, the terminal portions of said springs being embedded in a slab of cured flexible polyurethane foam.]

11. An innerspring foam mattress comprising an innerspring assembly including a plurality of springs, and a pair of slabs of cured flexible polyurethane foam material melted onto the opposed ends of said springs so that said spring ends are embedded in said slabs.

12. An innerspring foam mattress comprising an innerspring assembly including a plurality of springs and a pair of slabs of cured flexible polyurethane foam material foamed onto the opposed ends of said springs so that said spring ends are embedded in said slabs.

*13. A method of manufacturing innerspring foam cushions and mattresses comprising forming an innerspring assembly and foaming a slab of flexible polyurethane foam material about at least the terminal portions of the springs on one surface of said assembly.*

*14. A method of manufacturing innerspring foam cushions and mattresses comprising forming an innerspring assembly, foaming a slab of flexible polyurethane foam material about the terminal portions of the springs on one surface of said assembly, and bonding the terminal portions of the springs on the other surface of said assembly to a common layer of material.*

*15. A method according to claim 14 wherein said material is fabric and said terminal portions are bonded to said fabric by polyurethane foam.*

*16. A method of manufacturing innerspring foam cushions and mattresses comprising the steps of forming a slab of flexible polyurethane foam material, forming an innerspring assembly, heating the ends of said springs on one surface of said assembly and applying said heated spring ends to said slab to cause said heated spring ends to sink into said slab and adhere thereto.*

*17. A method of manufacturing innerspring foam cushions and mattresses comprising the steps of forming a slab of flexible polyurethane foam material, forming an innerspring assembly, heating the ends of said springs on one surface of said assembly, applying said heated spring ends to said slab to cause said heated spring ends to sink into said slab and adhere thereto, and bonding the terminal portions of the springs on the other surface of said assembly against excessive movement.*

*18. A method of manufacturing innerspring foam cushions and mattresses comprising the steps of forming a slab of flexible polyurethane foam material, forming an innerspring assembly, heating the ends of said springs on one surface of said assembly, applying said heated spring ends to said slab to cause said heated spring ends to sink into said slab and adhere thereto, and bonding the terminal portions of the springs on the other surface of said assembly to a common layer of material.*

*19. A method according to claim 18 wherein said material is fabric and said terminal portions are bonded to said fabric by polyurethane foam.*

*20. A cushioned body support comprising an innerspring assembly having opposed terminal portions with at least the terminal portions on one surface of said assembly embedded in a polyurethane foam slab.*

*21. An innerspring foam mattress comprising an innerspring assembly having opposed terminal portions with the terminal portions on one surface of said assembly embedded in a polyurethane foam slab and means bonding*

*the terminal portions on the other surface of said assembly against excessive movement.*

*22. A cushioned body support comprising an innerspring assembly having opposed terminal portions with the terminal portions on one surface of said assembly embedded in a polyurethane foam slab and means bonding the terminal portions on the other surface of said assembly to a layer of fabric.*

*23. A support according to claim 22 wherein said terminal portions are bonded to said fabric by polyurethane foam.*

References Cited in the file of this patent or the original patent

UNITED STATES PATENTS

| | | |
|---|---|---|
| 2,576,045 | Robinson et al. | Nov. 20, 1951 |
| 2,626,408 | Wesley | Jan. 27, 1953 |
| 2,785,440 | Toulmin | Mar. 19, 1957 |
| 2,785,739 | McGregor et al. | Mar. 19, 1957 |

FOREIGN PATENTS

| | | |
|---|---|---|
| 807,009 | Germany | June 25, 1951 |
| 1,051,897 | France | Sept. 23, 1953 |